No. 854,043. PATENTED MAY 21, 1907.
G. M. KNEUPER.
PROCESS OF MAKING FILTERING MATERIAL.
APPLICATION FILED OCT. 3, 1906.
2 SHEETS—SHEET 1.
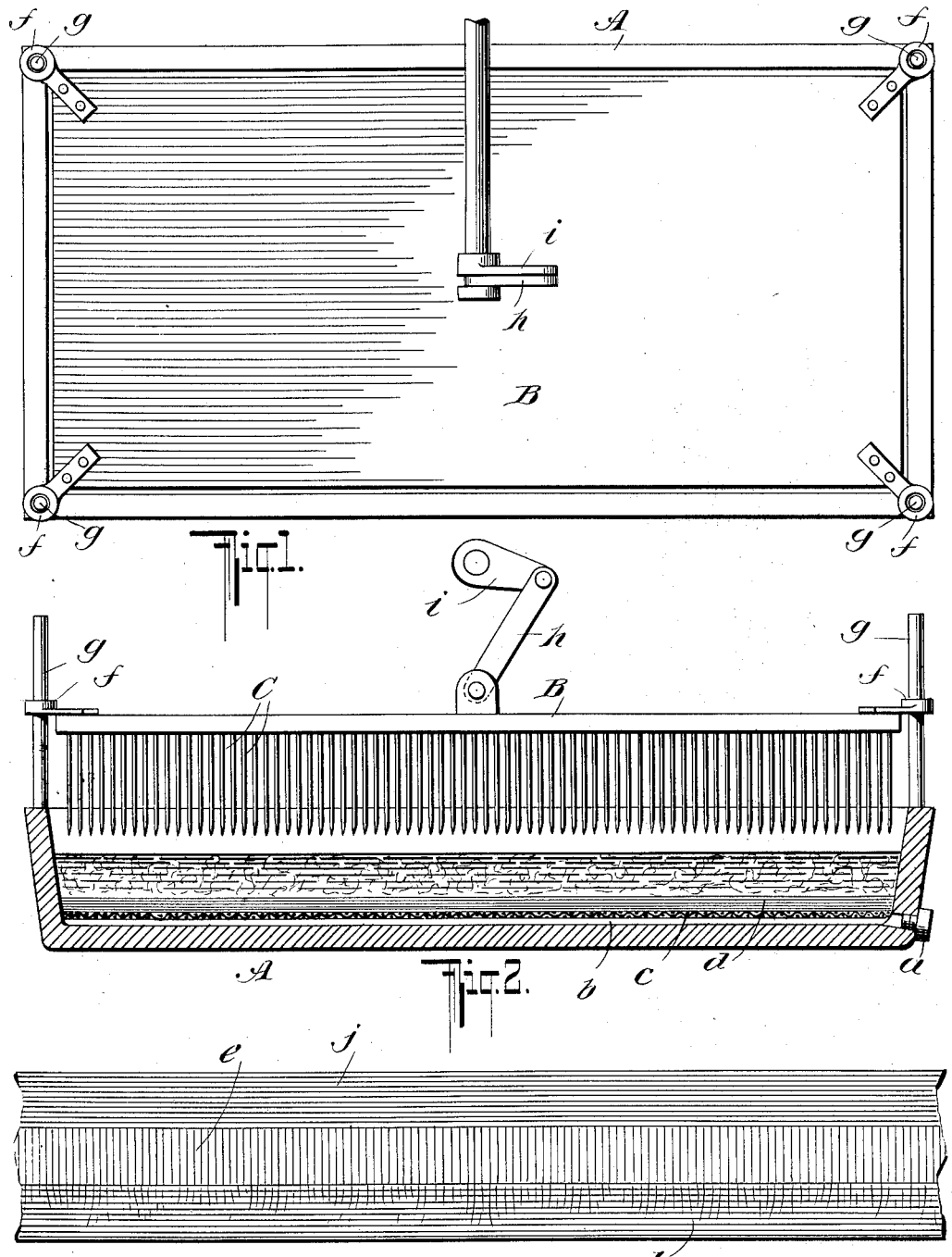

No. 854,043. PATENTED MAY 21, 1907.
G. M. KNEUPER.
PROCESS OF MAKING FILTERING MATERIAL.
APPLICATION FILED OCT. 3, 1906.
2 SHEETS—SHEET 2.
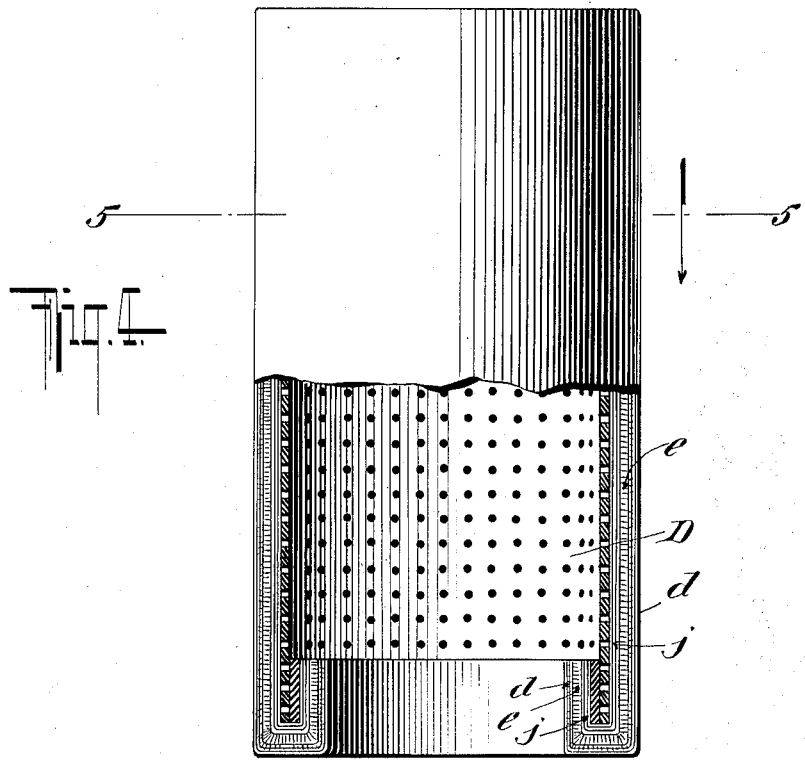
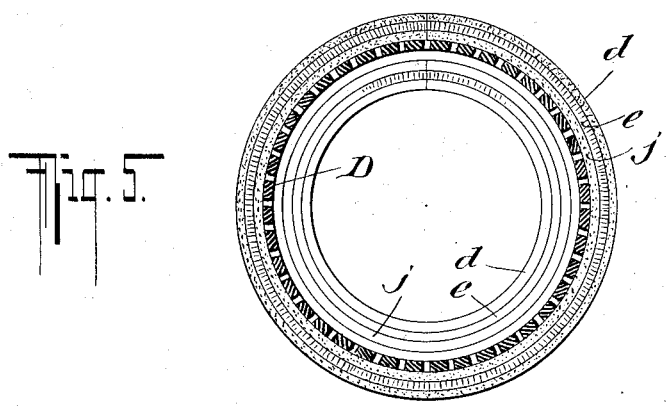
WITNESSES
INVENTOR
George M. Kneuper
BY
Briesen
ATTORNEYS

UNITED STATES PATENT OFFICE.

GEORGE M. KNEUPER, OF NEW YORK, N. Y., ASSIGNOR OF ONE-THIRD TO GEORGE KNEUPER AND ONE-THIRD TO KATE KNEUPER.

PROCESS OF MAKING FILTERING MATERIAL.

No. 854,043.     Specification of Letters Patent.     Patented May 21, 1907.

Original application filed May 29, 1906, Serial No. 319,280. Divided and this application filed October 3, 1906. Serial No. 337,168.

*To all whom it may concern:*

Be it known that I, GEORGE M. KNEUPER, a citizen of the United States, and a resident of the borough of Brooklyn, county of Kings, city and State of New York, have invented certain new and useful Improvements in Processes of Making Filtering Material, of which the following is a specification.

This invention relates to a new filtering material which is intended to allow viscous and other liquid and semi-liquid matters to pass through it with reasonable speed.

Filters are usually made dependent upon the existence in the filtering bodies of channels or passages, but in most filtering bodies known to me these passages are not regulated in the process of manufacture and are frequently interrupted, being mere cavities in which the matter to be filtered is apt to lodge and from which it is almost impossible to dislodge it.

The object of my invention is to make a filter in which the passages for the material to be filtered are rendered continuous, and regulated so that they shall be continuous or practically so.

In making my improved filter I use an apparatus which is illustrated in the accompanying drawing, in which Figure 1 represents a top view of such apparatus; Fig. 2 a vertical central section thereof, Fig. 3 a vertical section on a very much enlarged scale of my improved filter; Fig. 4 is an elevation partly in section showing one way of using my improved filtering material; and Fig. 5 is a section thereof on line 5—5 of Fig. 4.

In making my improved filter the process is as follows: I take a vat A which is open on top and has an outlet opening at *a* near the bottom, and a plug for closing the same. Upon the bottom of this vat are arranged series of slats *b*, upon which I lay a wire screen *c*, so that water contained in the vat may get under this wire screen. Upon this wire screen *c* I then place a layer *d* of cotton, being a sheet of pure cellulose or cotton of that kind in which the fibers run parallel to each other. I then fill the tank nearly full of water and place in it an amount of cotton pulp or wood pulp, preferably the kind known as sulfite pulp, made from poplar wood, sufficient to make when collected, the intermediate layer *e* (see Fig. 3) of my filter. The pulp is suspended in the water contained in the tank and is evenly distributed therein. If I did nothing to this pulp but merely withdrew the water by opening the holes *a*, I would obtain an ordinary wood pulp filter with the pores irregularly distributed, many of them mere cavities without outlets, and many of them therefore useless for filtering purposes. But in order to obviate the creation of these incongruous passages, and to make the filter passages continuous and distribute them evenly, I use a needle-board B which is set at the lower side with close needles C or needle-like projections. The drawing (Fig. 2) shows of course only one row of such needles, but there are repeated rows, as many as the board will hold, according to the width of the tank A. In the alternating rows it is preferable that the needles break joints. Sixty-four needles to the square inch is an efficient number. The board B has suitable guide-loops *f* which embrace suitable stationary guide-posts *g*, and is connected by the rod *h* with a crank *i* or other suitable mechanism for rapidly moving the board B and the needles which it carries, up and down. In operation these needles are forced rapidly through the water and partly into the cotton layer *d*, carrying the pulp in the tank close to and partly into said layer. Each needle in descending, displaces some of the pulp, and as the descent is very rapid, and the re-ascent equally rapid, the pulp fibers will gradually be given an approximately vertical direction, thus extending about at a right angle to the fibers of the cotton layer *d*. As the fibers penetrate into the cotton layer (see Fig. 3), the two layers *d* and *e* will be firmly connected. The water is then allowed to run off, by opening the outlet *a*, and thereupon the needle-board is again reciprocated up and down, to more firmly drive the pulp fibers into the cotton layer and insure a more regular distribution and arrangement of the pulp fibers. When this operation has been carried on for a sufficient length of time, I put another layer of cotton *j* upon the intermediate layer *e*, having first removed the board B. This layer should be of the same kind as the layer *d*, that is, with the fibers all running in the same direction, and preferably parallel to those of the lower layer *d*. This brings the pulp body of the filter into position between the two cotton layers *d* and *j* (see Fig. 3) and results in the production of a filter in which the main body e has transverse pores, all, or nearly all, of which are continuous.

With the aid of this filter I can operate on viscous liquids and the like, much more rapidly than with any other filter heretofore known. The filter body e can be used for filtering and analogous purposes, if desired.

A sheet of filtering material made as above described can be used in any suitable manner, but I prefer to wrap it upon a perforated cylinder D of metal or other stiff material as shown in Figs. 4 and 5 in substantially the same manner as disclosed in my Patent No. 796,519, dated August 8, 1905. Care should be taken however, to have the fibers of the sheets d and j run lengthwise of the cylinder, that is, transversely to the direction of the flow of the liquid, so that the fibers of the pulp layer e will run substantially parallel to the direction in which the liquid passes through the filter.

It is to be understood that while I have shown the two edges of the filtering sheet abutting against each other in Fig. 5, in practice these edges preferably overlap.

This application is a division of one filed by me in the United States Patent Office on May 29, 1906, Serial No. 319,280.

What I claim is:

1. The process herein described of making a pulp filter, which process consists in reciprocating a series of needles through the water in which the pulp is suspended.

2. The herein-described process of making a filter which consists in pouring a body of liquid containing pulp in suspension over a sheet of fibrous filtering material, and then driving the individual pulp fibers downward to give them a substantially vertical direction.

3. The herein-described process of making a filter which consists in pouring a body of liquid containing pulp in suspension over a sheet of fibrous filtering material, and then driving the individual pulp fibers downward into the said sheet to give them a substantially vertical direction and to connect them with the said sheet.

4. The herein-described process of making a filter which consists in pouring a liquid containing pulp in suspension over a sheet of fibrous filtering material, driving the individual fibers downward to cause them to assume a substantially vertical direction, then withdrawing the water, and thereupon again driving the fibers downward to perfect their vertical arrangement.

5. The herein-described process of making filters, which consists in pouring a liquid containing pulp in suspension over a sheet of fibrous filtering material, driving the individual pulp fibers downward into the said sheet, thus causing them to assume a substantially vertical direction, then removing the water and thereupon again driving the pulp fibers downward to perfect their vertical arrangement.

6. The herein-described apparatus for making a pulp filter, which apparatus consists of a tank, a needle-board having closely set needles and mechanism for rapidly reciprocating said needle-board.

In testimony whereof, I have signed this specification in the presence of two subscribing witnesses.

GEORGE M. KNEUPER.

Witnesses:
 JOHN LOTKA,
 JOHN A. KEHLENBECK.